US010438248B2

(12) United States Patent
Gupta et al.

(10) Patent No.: US 10,438,248 B2
(45) Date of Patent: Oct. 8, 2019

(54) SYSTEMS AND METHODS FOR DETERMINING ADVERTISING SERVICES AT MULTIPLES TIMES FOR DELIVERING TO DEVICES FROM ANY AD SOURCE

(71) Applicant: Vungle, Inc., San Francisco, CA (US)

(72) Inventors: Arvind Gupta, San Carlos, CA (US); Wayne Chan, Millbrae, CA (US); Daniel Kang, San Francisco, CA (US); Michael Deignan, San Francisco, CA (US); Sasha Solomon, San Francisco, CA (US); Raymond Myers, Foster City, CA (US)

(73) Assignee: Vungle, Inc., San Francisco, CA (US)

( * ) Notice: Subject to any disclaimer, the term of this patent is extended or adjusted under 35 U.S.C. 154(b) by 1073 days.

(21) Appl. No.: 14/609,258

(22) Filed: Jan. 29, 2015

(65) Prior Publication Data
US 2015/0287105 A1   Oct. 8, 2015

Related U.S. Application Data

(63) Continuation-in-part of application No. 14/260,155, filed on Apr. 23, 2014, now Pat. No. 9,336,539.
(Continued)

(51) Int. Cl.
*G06Q 30/02* (2012.01)
*G06Q 30/00* (2012.01)
(Continued)

(52) U.S. Cl.
CPC ..... *G06Q 30/0277* (2013.01); *H04L 43/0894* (2013.01); *H04L 65/604* (2013.01)

(58) Field of Classification Search
CPC ................... G06Q 30/0207–30/0277
(Continued)

(56) References Cited

U.S. PATENT DOCUMENTS 6,571,279 B1   5/2003   Herz et al.
6,704,930 B1   3/2004   Eldering et al.
(Continued)

FOREIGN PATENT DOCUMENTS

WO   2015024170 A1   10/2015
WO   2015153919 A1   10/2015

OTHER PUBLICATIONS

STIC Search Report; dated May 21, 2018; Gissele Luzcando (Year: 2018).*
(Continued)

*Primary Examiner* — Matthew T Sittner
*Assistant Examiner* — Richard G Reinhardt
(74) *Attorney, Agent, or Firm* — Jaffery Watson; Mendonsa & Hamilton LLP

(57) ABSTRACT

Methods and systems are described for providing advertising services in a predictive manner to a device with an advertising exchange. In one embodiment, a system receives a configuration call from a device upon initiation of a software application and associated advertising services software on the device. The system generates, prior to a predicted ad play event on the device, a predictive ad request for obtaining at least one advertisement (ad) from at least one of an ad store and an advertising exchange prior to the predicted ad play event. The at least one ad is stored on the device prior to an actual ad play event. The system determines, just prior to the actual ad play event, a bandwidth for a connection between the device and the system. The system determines if any ad source includes at least one ad that is more likely to convert or cause user interaction than the ads stored on the device based on the bandwidth for the connection between the device and the system.

20 Claims, 11 Drawing Sheets

Related U.S. Application Data

(60) Provisional application No. 61/974,981, filed on Apr. 3, 2014.

(51) Int. Cl.
*H04L 29/06* (2006.01)
*H04L 12/26* (2006.01)

(58) Field of Classification Search
USPC .................................................. 705/14, 319
See application file for complete search history.

(56) References Cited

U.S. PATENT DOCUMENTS

| | | | |
|---|---|---|---|
| 8,108,893 B2 | 1/2012 | Haberman et al. | |
| 8,561,104 B1 | 10/2013 | Dow et al. | |
| 2002/0026638 A1* | 2/2002 | Eldering | G06Q 30/02 725/42 |
| 2002/0178445 A1* | 11/2002 | Eldering | G06Q 30/02 725/32 |
| 2013/0097028 A1* | 4/2013 | Han | G06Q 30/02 705/14.71 |
| 2013/0110636 A1 | 5/2013 | Bott et al. | |

OTHER PUBLICATIONS

Demand-side platform, http://en.wikipedia.org/wiki/Demand-side_Platform, Mar. 24, 2014, 2 pages.
View-through rate, http://en.wikipedia.org/wiki/View-through_rate, Mar. 24, 2014, 2 pages.
Iab. Digital Video Ad Serving Template (VAST) 3.0, http://www.iab.net/guidelines/508676/digital_video/vsuite/vast, Mar. 24, 2014, 3 pages.
Iab. Video Ad Serving Template (VAST), Interactive Advertising Bureau, http://www.iab.net/vsuite/vast, Jul. 19, 2012, 71 pages.
PCT International Search Report and Written Opinion for PCT Application No. PCT/US2015/024170, dated Jul. 21, 2015, 12 pages.
PCT International Search Report and Written Opinion for PCT Application No. PCT/US2015/024166, dated Jul. 21, 2015, 12 pages.
Prashanth Mohan et al: "Prefetching mobile ads", Computer Systems, ACM, 2 Penn Plaza, Suite 701 New York NY 10121-0701 USA, Apr. 15, 2013 (Apr. 15, 2013), pp. 267-280, XP058015573, DOI: 10.1145/2465351.2465378 ISBN: 978-1-4503-1994-2.
"Rich Media Mobile Advertising Guidelines", Sep. 8, 2013 (Sep. 8, 2013), XP55199710, Retrieved from the Internet: URL:https://web.archive.org/web/20130908164718/http:/Iwww.mmaglobal.com/files/rmma.pdf, 14 pages.
Examination Report for EP Application No. 15719905.0, 7 pages, Jan. 5, 2018.
Examination Report for EP Application No. 15719908.4, 8 pages, Jan. 5, 2018.
Office Action from U.S. Appl. No. 14/260,155, dated Jun. 23, 2014, 12 pages.
Office Action from U.S. Appl. No. 14/260,155, dated Sep. 25, 2014, 11 pages.
Office Action from U.S. Appl. No. 14/260,155, dated Jan. 15, 2015, 28 pages.
Office Action from U.S. Appl. No. 14/260,155, dated Aug. 19, 2015, 20 pages.
Notice of Allowance from U.S. Appl. No. 14/260,155, dated Mar. 24, 2016, 12 pages.
Office Action from U.S. Appl. No. 14/260,152, dated Jun. 19, 2014, 11 pages.
Office Action from U.S. Appl. No. 14/260,152, dated Sep. 25, 2014, 11 pages.
Final Office Action from U.S. Appl. No. 14/260,152, dated Jan. 8, 2015, 16 pages.
Office Action from U.S. Appl. No. 14/260,152, dated Aug. 18, 2015, 20 pages.
Notice of Allowance from U.S. Appl. No. 14/260,152, dated Mar. 29, 2016, 12 pages.

* cited by examiner

SYSTEMS AND METHODS FOR DETERMINING ADVERTISING SERVICES AT MULTIPLES TIMES FOR DELIVERING TO DEVICES FROM ANY AD SOURCE

RELATED APPLICATIONS

This application claims the benefit of U.S. Provisional Application No. 61/974,981, filed on Apr. 3, 2014, the entire contents of which are hereby incorporated by reference. This application claims the benefit of U.S. Non-Provisional application Ser. No. 14/260,155, filed on Apr. 23, 2014, the entire contents of which are hereby incorporated by reference.

This application is related to application Ser. No. 14/260,152, filed Apr. 23, 2014, entitled: SYSTEMS AND METHODS FOR PROVIDING ADVERTISING SERVICES TO DEVICES WITH AN ADVERTISING EXCHANGE.

FIELD OF THE INVENTION

Embodiments of the invention are generally related to systems and methods for determining advertising services at multiple times for delivering to devices from any ad source.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods and systems are described for providing advertising services in a predictive manner to devices. In one embodiment, a system includes a storage medium to store one or more software programs and processing logic that is configured to execute instructions of at least one software program to receive a configuration call from a device upon initiation of a software application and associated advertising services software on the device. The system generates, prior to a predicted ad play event on the device, a predictive ad request for obtaining at least one advertisement (ad) from at least one of an ad store and an advertising exchange prior to the predicted ad play event.

The at least one ad is stored (e.g., cached) on the device prior to an actual ad play event. The system determines, just prior to the actual ad play event, a bandwidth for a connection between the device and the system. The system determines if any ad source includes at least one ad that is more likely to convert or cause user interaction than the at least ad stored on the device based on the bandwidth for the connection between the device and the system. An ad that is most likely to convert or cause user interaction is selected from the cached ads or streamed ads from any ad source. The selected ad is then played on the device for the actual ad play event.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
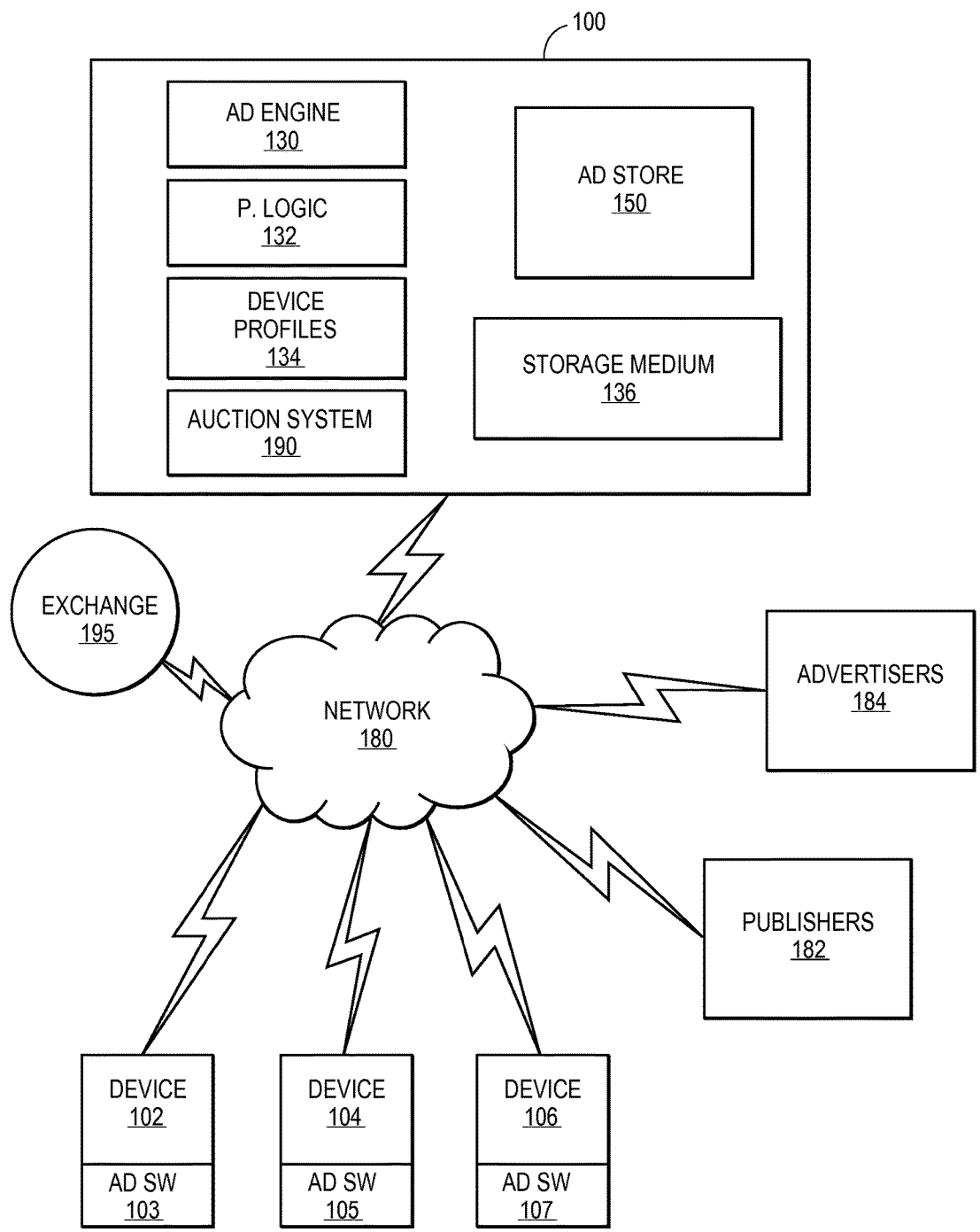
FIG. 1 shows an embodiment of a block diagram of a system 100 for providing advertising services in a predictive manner with an advertising exchange in accordance with one embodiment.

Methods and systems are described for providing advertising services in a predictive manner to devices using an ad exchange. In one embodiment, a system includes a storage medium to store one or more software programs and processing logic that is configured to execute instructions of at least one software program to receive a configuration call from a device upon initiation of a software application and associated advertising services software (e.g., software development kit (SDK)) on the device. The processing logic is further configured to generate, prior to a predicted ad play event on the device, a predictive ad request for obtaining at least one advertisement (ad) from at least one of an ad store and an advertising exchange prior to the predicted ad play event.

An auction system provides a mechanism for third party participants to bid on providing advertising services including in-application (in-app) advertising services to the device in response to a predictive ad exchange request. The auction system captures demand for providing advertising services in real time or near real time prior to a predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of mobile applications and games. The publishers are interested in generating revenue through displaying video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC) or a cost-per-mille (CPM) basis with a mille representing a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of an ad system 100 for providing advertising services in a predictive manner with an advertising exchange in accordance with one embodiment. The ad system 100 includes an advertising engine 130, processing logic 132, device profiles 134, storage medium 136, and an auction system 190. The auction system 190 may be integrated with the ad system or separate from the ad system. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, etc.). A device profile for a device is based on one or more parameters including location (e.g., GPS coordinates, IP address, cellular triangulation, etc.) of the device, a social profile for a user of the device, and categories or types of applications installed on the device. Each device includes a respective advertising services software 103, 105, 107 (e.g., a software development kit (SDK)) that includes a set of software development tools for advertising services including in-app advertising services. The publishers 182 publish content along with ads. The system 100, devices 102, 104, 106, advertisers 184, publishers, and an ad exchange 195 with third party exchange participants communicate via a network 180 (e.g., Internet, wide area network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134), and user characteristics (e.g., age, gender, ethnicity, location, etc.). etc.

In one embodiment, the system 100 includes a storage medium 136 to store one or more software programs. Processing logic (e.g., 132) is configured to execute instructions of at least one software program to receive an advertising request from a device upon the device having an ad play event for an initiated software application and associated advertising services software (e.g., software development kit (SDK)) on the device. The processing logic is further configured to send a configuration file to the device in response to the configuration call. The configuration file includes different options for obtaining at least one advertisement (ad) to play on the device during an ad play event. The options include playing at least one ad cached on the device, obtaining at least one ad from an ad store of the ad system 100, and obtaining at least one ad from an advertising exchange that includes $3^{rd}$ party participants.

Figure 2:
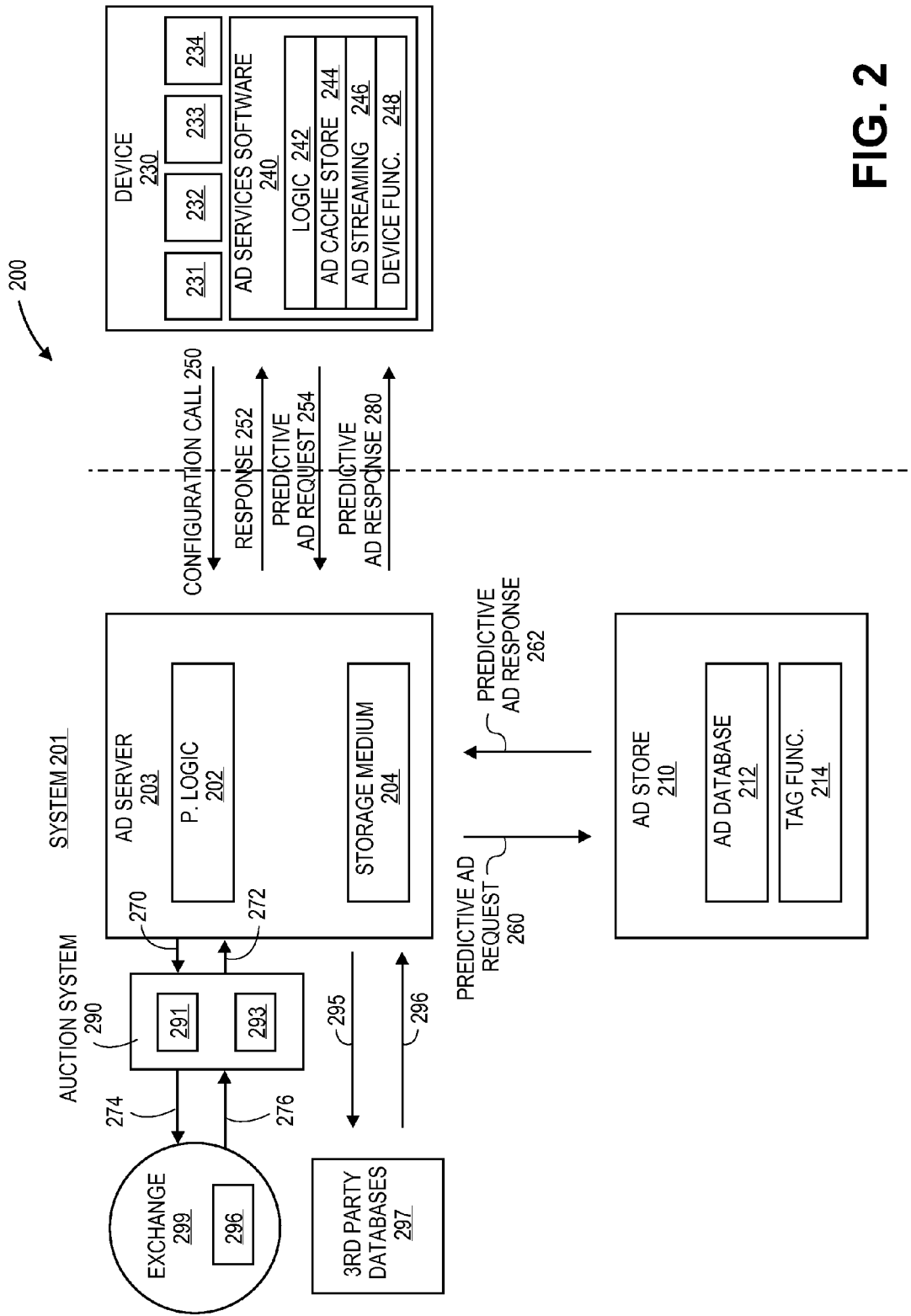
FIG. 2 illustrates a flow diagram of operations for providing advertising services including ads or ad campaigns in a predictive manner with an advertising exchange having third party exchange participants in accordance with certain embodiments.

FIG. 2 illustrates a flow diagram of operations for providing advertising services including ads or ad campaigns in a predictive manner with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the software application and associated advertising services software 240. At operation 252, the processing logic 202 sends a response that includes the configuration file to the device 230 in response to the configuration call. The configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 provides at least one better ad in a timely manner (e.g., in time for a predicted ad play event, within a time period set by the configuration file) then the better ad will play during the predicted ad play event. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file.

At operation 254, prior to a predicted ad play event, the processing logic of the ad server optionally receives a predictive ad request with a configurable option (e.g., options 1-8) of the configuration file based on an anticipated ad play event occurring in the near future (e.g., 1 hr, 15 minutes, 60 seconds, 10 seconds, etc.). Alternatively, the ad server generates a predictive ad request based on receiving the configuration call, which indicates that the user has initiated a software application and an anticipated ad play event will likely occur in the near future even though no predictive ad request is received from the device. The predictive ad request may also include different types of information including a publisher of the selected software application, placement information for placement of an ad in-app, user characteristics, and device characteristics. The ad server processes the predictive ad request and accesses at least one of the ad store 210 and the exchange 299 for options 2-8 of the configuration file. The ad server may determine which option of options 1-8 will be processed or enabled for processing the ad request based on one or more configurable parameters. Alternatively, the device or user may determine which option of options 1-8 will be processed or enabled based on these parameters. In one embodiment, the configurable parameters include the bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). For example, if a low bandwidth is detected between the ad server and the device or between the ad system and auction participants, then the ad server may sent an ad request to the ad store or the auction system sooner rather than later. In one embodiment, the ad request is sent to the ad store or the auction system immediately or a short time after the low bandwidth is detected. A third party participant within the exchange or outside of the exchange may provide the ad system with timing parameters. For example, a third party participant may indicate to only request an ad if an ad is about to be served to a device (e.g., within 2 seconds, within 15 seconds) or if an ad will likely be served to a device in the next hour or so.

For option 1, the device plays at least one ad from cache. For options that access the ad store 210, at operation 260, the processing logic 202 sends a predictive ad call or request to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the predictive ad call or request. The ad response includes a payload with one or more potential ads or ads campaigns for being streamed to the device 230 or optionally an ad serving tag for accessing one or more third party ad databases 297. If the ad server receives an ad serving tag, then the ad server sends an ad request to the third party database at operation 295 and receives an ad response at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the configurable file.

The ad server upon processing a predictive ad request may access the exchange 299 given certain options (e.g., options 3, 4, 7, and 8) of the configuration file. In this case, the ad server sends a predictive exchange request 270 to the auction system 290 having an auction engine 291 and database 293 prior to a predicted ad play event on the device. Alternatively, the auction system is integrated with the ad system 201. The auction engine 291 processes the predictive exchange request 270 and generates an auction based on different business rules including at least one of a price (e.g., a floor or lowest price for the ad or ad campaign), inventory allocation, and participants who can participate in the auction. The auction determines which participant can provide a better ad for the device in a timely manner. At operation 274, the auction system 290 sends a predictive ad exchange request to each participant of the auction. The predictive ad exchange request includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with a predictive ad exchange response at operation 276. The auction engine processes the predictive ad exchange responses (bids) and determines which participant(s) if any will serve a better ad for playing on the device for a predicted ad play event. The responses and ads from the participants can be saved in the database 293. At operation 272, a predictive ad response is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 280, the ad server can then select at least one better ad from the ad store, a participant with a winning or selected bid from the exchange, a cached ad on the device, or optionally a third party database 297 that has not participated in the exchange. A better ad is anticipated to be more likely to convert than a cached ad on the device. The at least one better ad if selected is then cached on the device or streamed to the device and played during the ad play event that has been predicted to occur.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during an ad play event. However, better, fresher, more relevant ads (i.e., higher converting ads) may be available in comparison to the cached ad of the conventional ad network.

In one embodiment, a system (e.g., system 201) includes an ad store (e.g., ad store 210 to store advertisements (ads) and an ad server (e.g., ad server 203) coupled to the ad store. The ad server includes a storage medium to store one or more software programs and processing logic that is configured to execute instructions of at least one software program to generate with the system, prior to a predicted ad play event on a device (e.g., device 230), a predictive ad request for obtaining at least one advertisement (ad) from at least one of the ad store and an advertising exchange (e.g., ad exchange 299) prior to the predicted ad play event. The processing logic is further configured to execute instructions to process the predictive ad request and determine whether the ad store of the system to be accessed for at least one ad to be cached on the device prior to an actual ad play event and whether the ad exchange to be accessed for at least one ad to be cached on the device prior to the actual ad play event. The processing logic is further configured to execute instructions to determine, just prior to the actual ad play event, a bandwidth for a connection between the device and the system.

The processing logic is further configured to execute instructions of at least one software program to determine if any ad source (e.g., ad store 210, exchange 299, third party databases 297) includes at least one ad that is more likely to convert than the ads cached on the device based on the bandwidth for the connection between the device 230 and the system 201 for streaming the at least one ad from any ad source to the device in time for the actual ad play event. The processing logic is further configured to execute instructions of at least one software program to select at least one ad that is most likely to convert from any ad source or the cached ads on the device prior to the actual ad play event.

In another embodiment, the processing logic is further configured to execute instructions of at least one software program to select at least one ad that is most likely to convert from the cached ads on the device prior to the actual ad play event if a sufficient bandwidth is not available for streaming an ad or ad campaign from any ad source to the device in time for the ad play event.

Figure 3A:
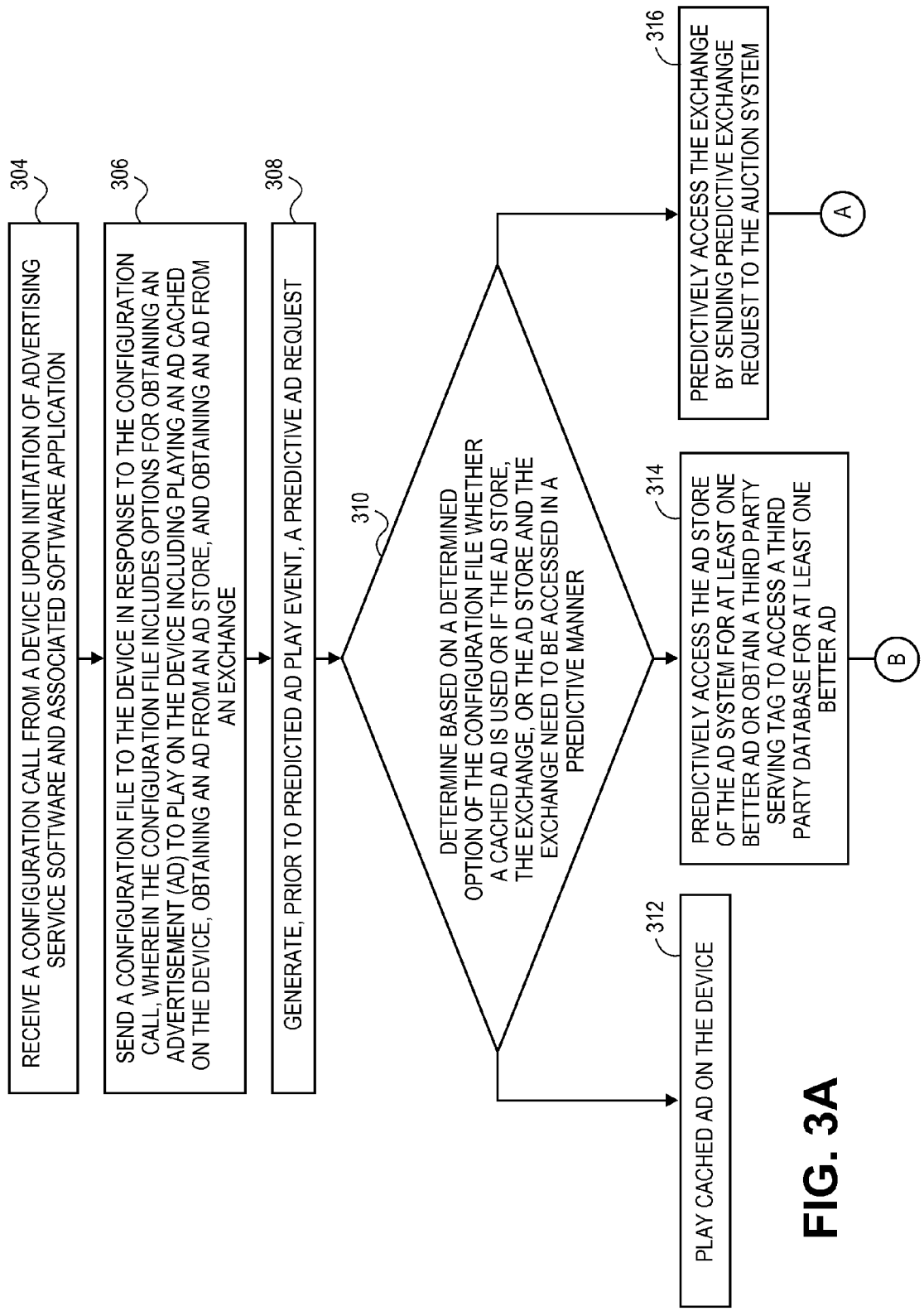
FIGS. 3A and 3B illustrate flow diagrams of operations for a method of providing advertising services including ads or ad campaigns in a predictive manner with an advertising exchange having third party exchange participants in accordance with certain embodiments.
Figure 3B:
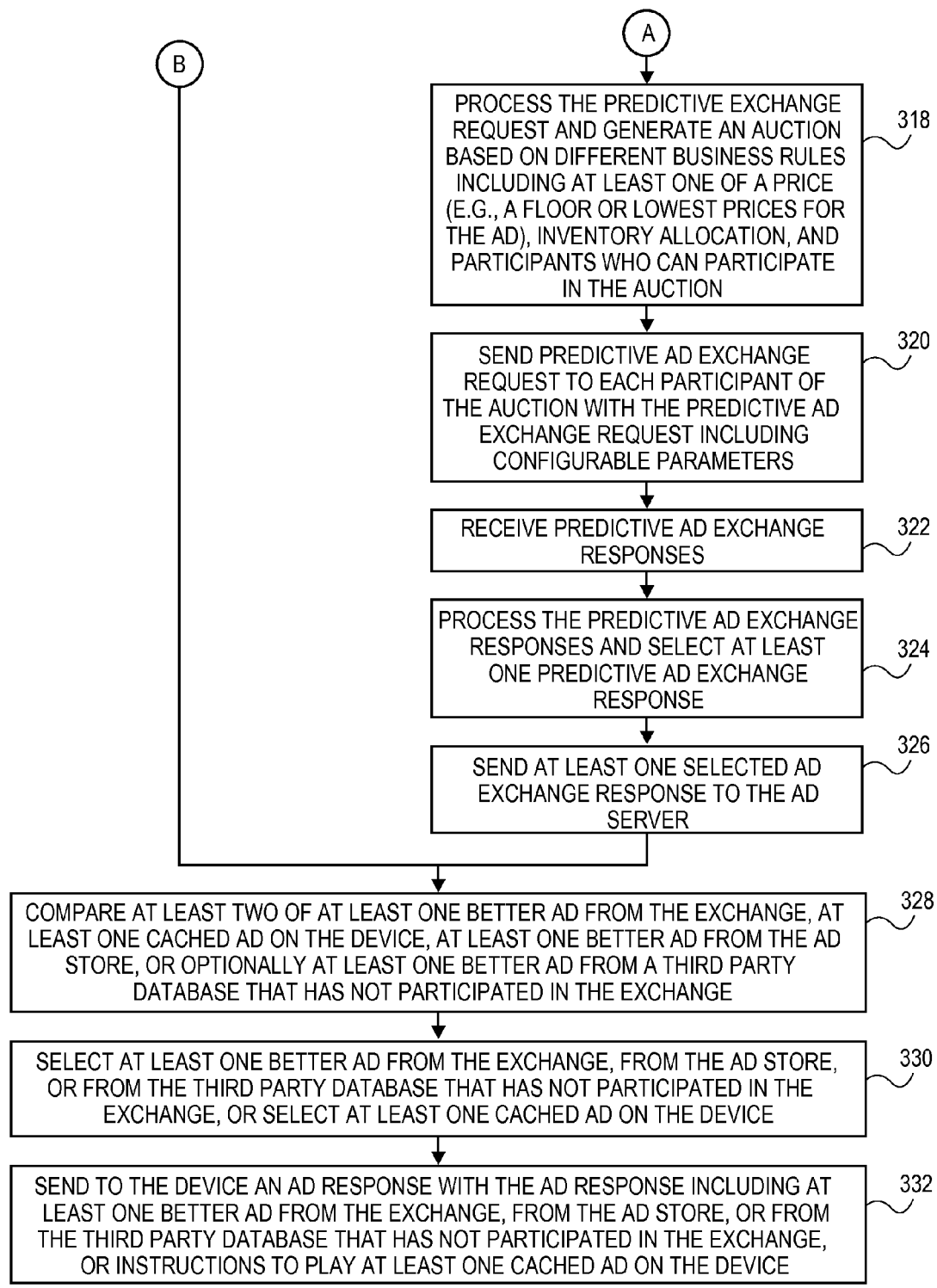

FIGS. 3A and 3B illustrate flow diagrams of operations for a method of providing advertising services including ads or ad campaigns in a predictive manner with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300.

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an ad play event at a future time for displaying or playing an ad on the display of the device. At operation 304, an ad server of an ad system receives a configuration call from the device upon the initiation of the advertising services software and associated software application. At operation 306, the ad server sends a configuration file to the device in response to the configuration call. The configuration file includes different options (e.g., options 1-8 as described in conjunction with the description of FIG. 2) for obtaining an ad to play for the ad play event that is predicted to occur in the future.

At operation 308, prior to the predicted ad play event, the processing logic of the ad server generates a predictive ad request based on an anticipated ad play event occurring in the near future (e.g., 1 hr, 15 minutes, 60 seconds, 10 seconds, etc.) or the ad server optionally receives a predictive ad request from the device. Receiving the configuration call from the device indicates that the user has initiated a software application and an anticipated ad play event will likely occur in the near future even if no predictive ad request is received from the device.

At operation 310, the ad server processes the predictive ad request and determines based on a determined option of the configuration file whether a cached ad on the device will be used (e.g., option 1 playing ad from device cache) or the ad store, the exchange, or the ad store and the exchange need to be accessed in a predictive manner for the predictive ad request. The ad server (or device functionality 248 of the device 230) determines which option of options 1-8 (or any available options of the configuration file) will be processed or enabled for processing the ad request based on one or more configurable parameters. In one embodiment, the configurable parameters include bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange).

At operation 312, for option 1, at least one ad is played on the device from cached ads on the device. At operation 314, for ad store options (e.g., options 2, 4, 6, or 8), the ad server predictively accesses the ad store of the ad system for at least one better ad or obtains a third party serving tag to access a third data base for at least one better ad. At operation 316, the ad server upon processing the ad request may predictively access the exchange given certain options (e.g., options 3, 4, 7, and 8) of the configuration file. In this case, the exchange is accessed by the ad server sending a predictive exchange request to the auction system. At operation 318, the auction system processes the predictive exchange request and generates an auction based on different business rules including at least one of a price (e.g., a floor or lowest price for the ad), inventory allocation, and participants who can participate in the auction. The auction determines which participant can provide at least one better ad for the device in a timely manner for a higher price. At operation 320, the auction engine sends a predictive ad exchange request to each participant of the auction. The ad exchange request includes configurable parameters including at least one of ad length, bit rate for playing the ad, ad categories, age ratings, a limit for a number of redirects for obtaining at least one ad to minimize latency, and the floor price. One or more participants then respond with predictive ad exchange responses at operation 322. The auction system processes the predictive ad exchange responses (bids) and selects at least one predictive ad exchange response if any for serving at least one better ad for playing on the device at operation 324. At operation 326, at least one selected predictive ad exchange response is sent from the auction system to the ad server. At operation 328, the ad server can optionally compare at least two of a selected at least one better ad from the exchange, at least one cached ad on the device, at least one better ad obtained from the ad store, or optionally at least one better ad from a third party database 297 that has not participated in the exchange. At operation 330, the ad server can then optionally select at least one better ad from the ad store, at least one better ad of a selected ad exchange response (bid) from the exchange, a cached ad on the device, or optionally at least one better ad from a third party database 297 that has not participated in the exchange. In another embodiment, the winning or selected ad from the exchange is sent to the device without comparing it to other ads (e.g., a cached ad, a better ad from the ad store). In an embodiment, the better ad from the ad store is sent to the device without comparing it to other ads. A better ad is anticipated to be more likely to convert (e.g., convert into a click or purchase or transaction) than a cached ad on the device. At operation 332, the ad server can then send to the device an ad response with at least one better ad from the ad store, at least one better ad from exchange, at least one ad from a third party database that has not participated in the exchange, or instructions to play the cached ad on the device. The at least one better ad is then cached on the device or streamed to the device and played during the ad play event that is predicted to occur in the future.

Figure 4:
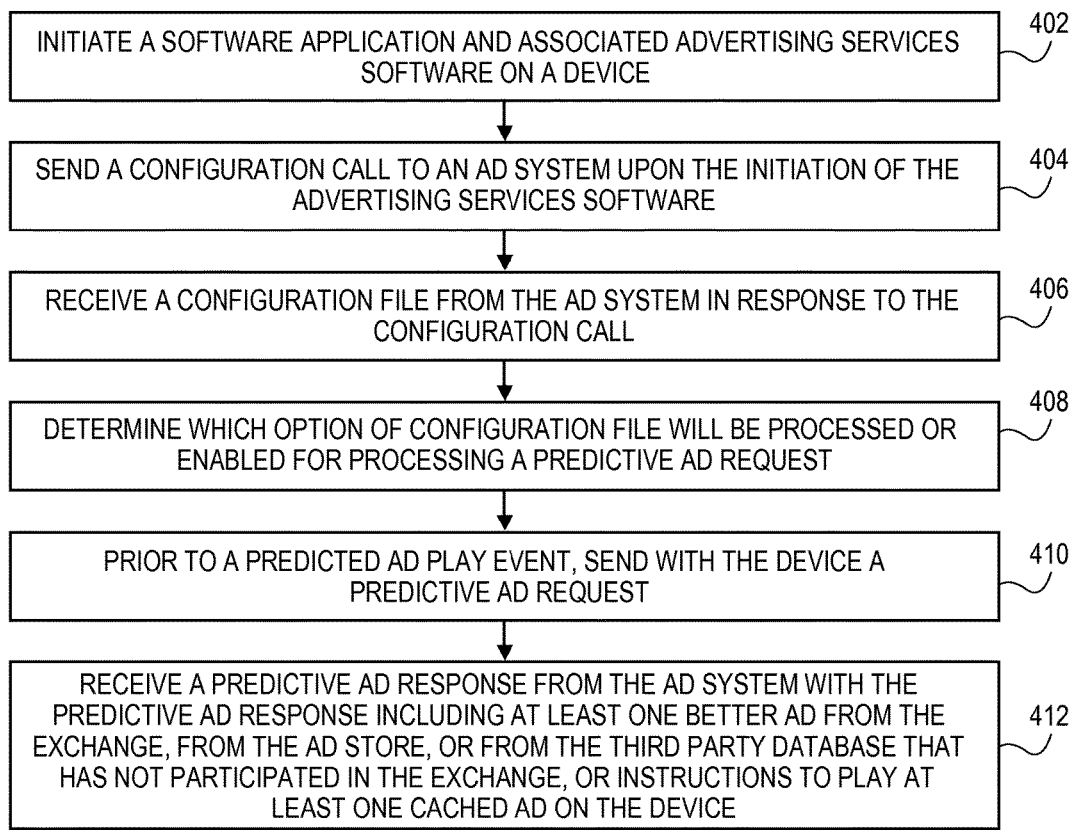
FIG. 4 illustrates a flow diagram of operations for a method of providing advertising services including ads or ad campaigns in a predictive manner with an advertising exchange having third party exchange participants in accordance with certain embodiments.

FIG. 4 illustrates a flow diagram of operations for a method of providing advertising services including ads or ad campaigns in a predictive manner with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 400.

In one embodiment, a device initiates a software application at operation 402. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 404, the device sends a configuration call to an ad server of an ad system upon the initiation of the advertising services software. At operation 406, the device receives a configuration file from the ad system in response to the configuration call. The configuration file includes different options (e.g., options 1-8 as described in conjunction with the description of FIG. 2) for obtaining at least one ad to play for a predicted ad play event that is predicted to occur in the future.

At operation 408, the device (or ad system) determines which option (e.g., 1-8) of the configuration file will be processed or enabled for processing a predictive ad request.

In one embodiment, this determination is based on one or more configurable parameters including bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). At operation 410, prior to the predicted ad play event, the device sends a predictive ad request with a configurable determined option (e.g., options 1-8, any available options) of the configuration file to the ad server. The ad server processes the predictive ad request and performs operations similar to operations 312-330 of FIG. 3. At operation 412, the device receives a predictive ad response from the ad system. The predictive ad response includes at least one better ad from the ad store, at least one better ad from the exchange, optionally instructions to play at least one ad cached on the device, or optionally at least one better ad from third party database that has not participated in the exchange for options 2-8. The at least one better ad that is selected for the predictive ad play event is then cached on the device or streamed to the device and played when the predicted ad play event occurs. For option 1, the at least one cached ad is played on the device during the ad play event.

In some embodiments, the operations of the methods disclosed herein can be altered, modified, combined, or deleted. For example, the operation 308 can occur early or later in the flow of operations of method 300. This determination of operation 308 may not occur until a latency is known for obtaining an ad from the ad store or from the exchange. In a similar manner, the operation 410 can occur early or later in the flow of operations of method 400. This determination of operation 410 may not occur until a latency is known for obtaining an ad from the ad store or from the exchange. The methods in embodiments of the present invention may be performed with an apparatus or data processing system as described herein. The apparatus or data processing system may be a conventional, general-purpose computer system or special purpose computers, which are designed or programmed to perform only one function, may also be used.

Figure 5:
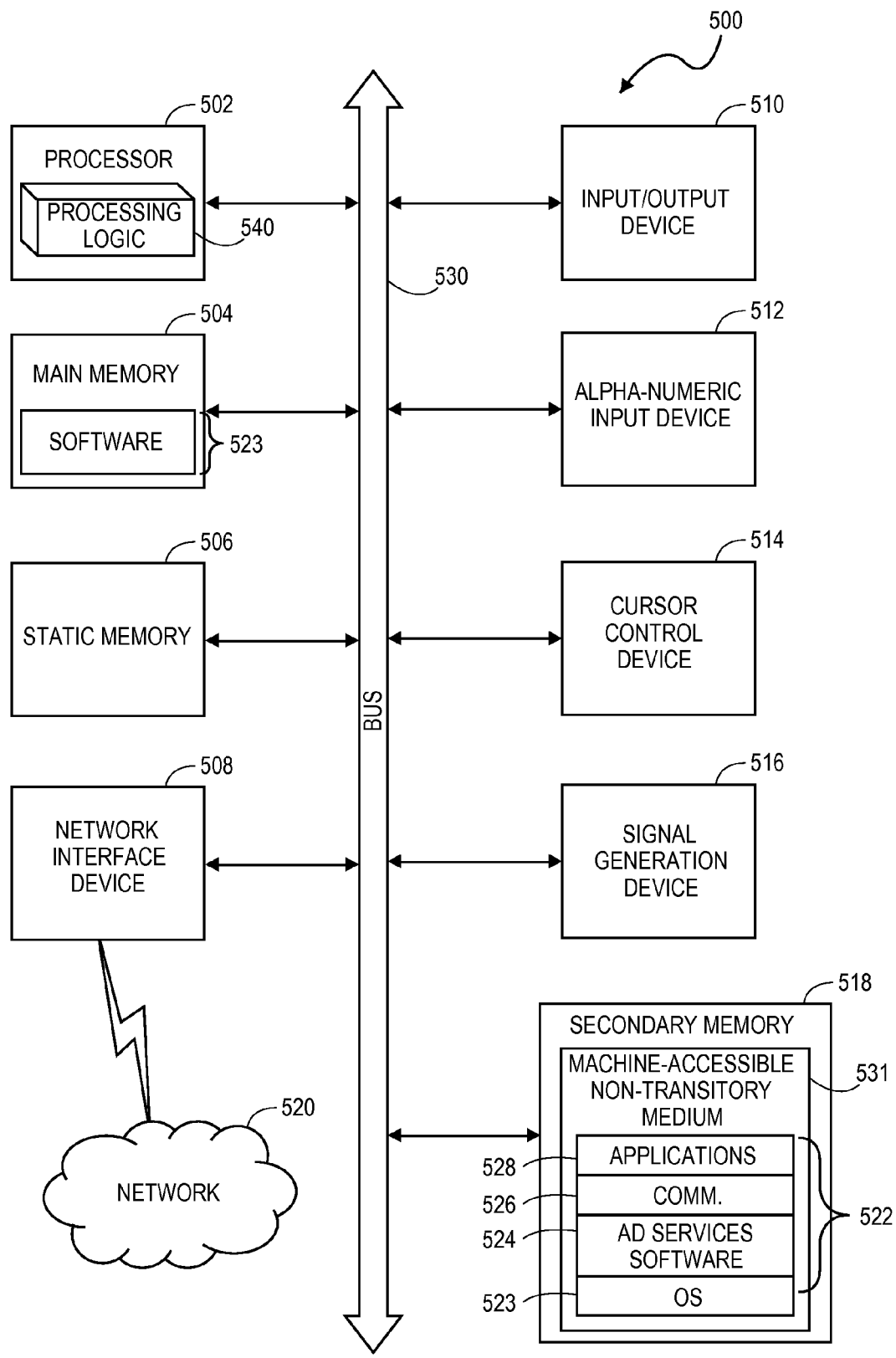
FIG. 5 illustrates a diagrammatic representation of a machine in the exemplary form of a device 500 within which a set of instructions, for causing the machine to perform any one or more of the methodologies discussed herein, may be executed in accordance with certain embodiments.

FIG. 5 illustrates a diagrammatic representation of a machine in the exemplary form of a computer system or device 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The device 500 may further include a network interface device 508. The device 500 also may include an input/output device 510 or display (e.g., a liquid crystal display (LCD), a plasma display, a cathode ray tube (CRT), or touch screen for receiving user input and displaying output), an optional alphanumeric input device 512 (e.g., a keyboard), an optional cursor control device 514 (e.g., a mouse), and a signal generation device 516 (e.g., a speaker).

The data storage device 518 may include a machine-accessible non-transitory medium 531 on which is stored one or more sets of instructions (e.g., software 522) embodying any one or more of the methodologies or functions described herein. The software 522 may include an operating system 523, advertising services software 524 (e.g., SDK 524), communications module 526, and applications 528 (e.g., publisher applications). The software 522 may also reside, completely or at least partially, within the main memory 504 (e.g., software 523) and/or within the processor 502 during execution thereof by the device 500, the main memory 504 and the processor 502 also constituting machine-accessible storage media. The software 522 or 523 may further be transmitted or received over a network 520 via the network interface device 508.

The machine-accessible non-transitory medium 531 may also be used to store data structure sets that define user identifying states and user preferences that define user profiles. Data structure sets and user profiles may also be stored in other sections of device 500, such as static memory 506.

In one embodiment, a machine-accessible non-transitory medium contains executable computer program instructions which when executed by a data processing system cause the system to perform any of the methods discussed herein.

In one embodiment, a method for providing advertising services with a system includes receiving a configuration call from a device upon initiation of a software application and associated advertising services software and generating, prior to a predicted ad play event on the device, a predictive ad request for obtaining at least one advertisement (ad) from at least one of an ad store and an advertising exchange prior to the predicted ad play event.

For example, in one embodiment, a method includes generating a configuration file for sending to the device in response to the configuration call, wherein the configuration file includes a plurality of options for obtaining at least one ad to play on the device including playing at least one ad cached on the device, obtaining at least one ad from an ad store, and obtaining at least one ad from the advertising exchange, wherein the predicted ad play event is predicted to occur at a future time based on receiving the configuration call from the device.

For example, in one embodiment, a method includes accessing the advertising exchange based on the predictive ad request and generating an auction based on different business rules including at least one of a floor price, inventory allocation, and participants who can participate in the auction.

For example, in one embodiment, a method includes sending a predictive ad exchange request to each participant of the auction with the predictive ad exchange request including configurable parameters including at least one of ad length, bit rate for playing the ad, ad categories, age ratings, a limit for a number of redirects to minimize latency, and a floor price.

For example, in one embodiment, a method includes receive ad exchange responses from one or more participants of the auction; process the ad exchange responses and determining which of the one or more participants if any will serve at least one better ad for the predicted ad play event.

For example, in one embodiment, a method includes sending to the device a predictive ad response with at least one better ad from one of the ad store and a selected participant from the advertising exchange.

While the machine-accessible non-transitory medium 531 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system includes a storage medium to store one or more software programs and processing logic that is configured to execute instructions of at least one software program to receive a configuration call from a device upon initiation of a software application and associated advertising services software (e.g., software development kit (SDK)) on the device. The processing logic is further configured to generate, prior to a predicted ad play event on the device, a predictive ad request for obtaining an advertisement (ad) from at least one of an ad store and an advertising exchange prior to the predicted ad play event.

For example, in one embodiment, the processing logic is configured to execute instructions of at least one software program to generate a configuration file for sending to the device in response to the configuration call. The configuration file includes different options for obtaining an advertisement (ad) to play on the device during an ad play event. The options include playing an ad cached on the device, obtaining an ad from an ad store of the ad system, and obtaining an ad from an advertising exchange that includes $3^{rd}$ party participants.

For example, in one embodiment, the processing logic is configured to execute instructions of at least one software program to access the advertising exchange based on the predictive ad request and generate an auction based on different business rules including at least one of a floor price, inventory allocation, and participants who can participate in the auction.

For example, in one embodiment, the processing logic is configured to execute instructions of at least one software program to send a predictive ad exchange request to each participant of the auction with the predictive ad exchange request including configurable parameters including at least one of ad length, bit rate for playing the ad, ad categories, age ratings, a limit for a number of redirects to minimize latency, and a floor price.

For example, in one embodiment, the processing logic is configured to execute instructions of at least one software program to receive ad exchange responses from one or more participants of the auction, process the ad exchange responses, and determine which of the one or more participants if any will serve at least one better ad for the predicted ad play event.

For example, in one embodiment, the processing logic is configured to execute instructions of at least one software program to send to the device a predictive ad response with at least one better ad from one of the ad store and a selected participant from the advertising exchange.

In one embodiment, an apparatus for providing advertising services includes a means for receiving a configuration call from a device upon initiation of a software application and associated advertising services software and a means for generating, prior to a predicted ad play event on the device, a predictive ad request for obtaining at least one advertisement (ad) from at least one of an ad store and an advertising exchange prior to the predicted ad play event.

For example, in one embodiment, the apparatus further includes a means for generating a configuration file for sending to the device in response to the configuration call. The configuration file includes a plurality of options for obtaining at least one ad to play on the device including playing at least one ad cached on the device, obtaining at least one ad from an ad store, and obtaining at least one ad from the advertising exchange, wherein the predicted ad play event is predicted to occur at a future time based on receiving the configuration call from the device.

For example, in one embodiment, the apparatus further includes a means for accessing the advertising exchange based on the predictive ad request, a means for generating an auction based on different business rules including at least one of a floor price, inventory allocation, and participants who can participate in the auction, means for sending a predictive ad exchange request to each participant of the auction with the predictive ad exchange request including configurable parameters including at least one of ad length, bit rate for playing the ad, ad categories, age ratings, a limit for a number of redirects to minimize latency, and a floor price. The apparatus also includes a means for receiving ad exchange responses from one or more participants of the auction, a means for processing the ad exchange responses, a means for determining which of the one or more participants if any will serve at least one better ad for the predicted ad play event, and a means for sending to the device a predictive ad response with at least one better ad from one of the ad store and a selected participant from the advertising exchange.

In one embodiment, a machine-accessible non-transitory medium containing executable computer program instructions which when executed by a device cause said device to perform a method. For example, in one embodiment, a method for providing advertising services for a device includes initiating a software application on a device, sending a configuration call to an ad system upon the initiation of the software application and associated advertising services software, and receiving a configuration file from the ad system in response to the configuration call. The configuration file includes a plurality of options for obtaining at least advertisement (ad) to play for a predicted ad play event on the device including playing at least one ad cached on the device, obtaining at least one ad from an ad store, and obtaining at least one ad from an ad exchange.

For example, in one embodiment, the method includes determining which option of the configuration file will be processed or enabled for processing a predictive ad request based on one or more configurable parameters including at least one of a bandwidth for a connection between the device and the ad system, device characteristics, user characteristics, a service level agreement of a publisher of the software application, a cache window, and business rules.

For example, in one embodiment, the method includes sending, prior to the predicted ad play event, the predictive ad request with a configurable determined option of the configuration file to the ad system and receiving a predictive ad response from the ad system with the ad response including at least one better ad from the ad store, at least one better ad from the ad exchange, at least one better ad from a third party database that has not participated in the ad exchange, or instructions to play at least one ad cached on the device. The predicted ad play event is predicted to occur at a future time.

Figure 6A:
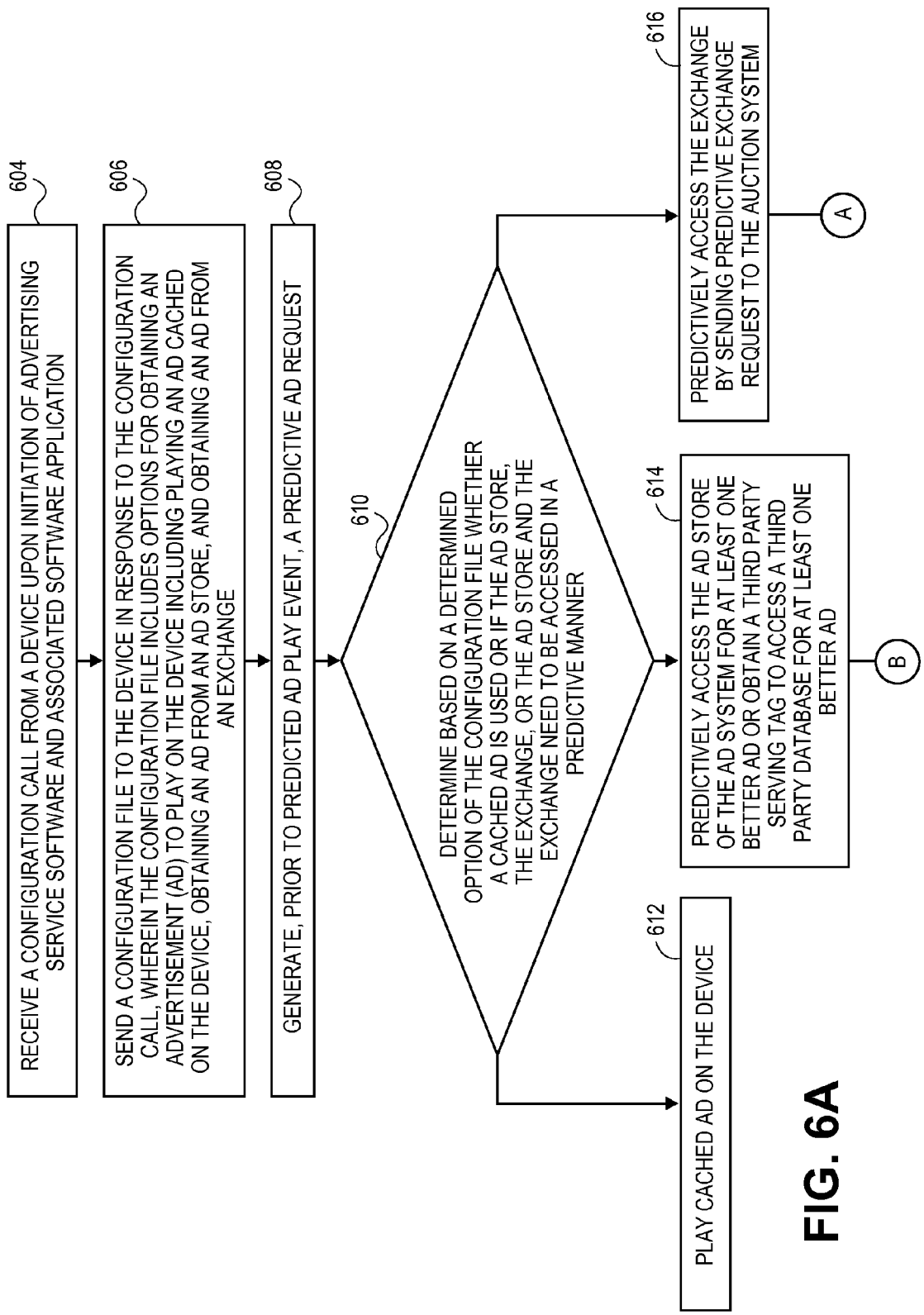
FIGS. 6A, 6B, and 6C illustrate flow diagrams of operations for a method of determining advertising services including stored (e.g., cached) ads and streamed ads at multiple times in a predictive manner to devices with an advertising exchange having third party exchange participants in accordance with certain embodiments.
Figure 6B:
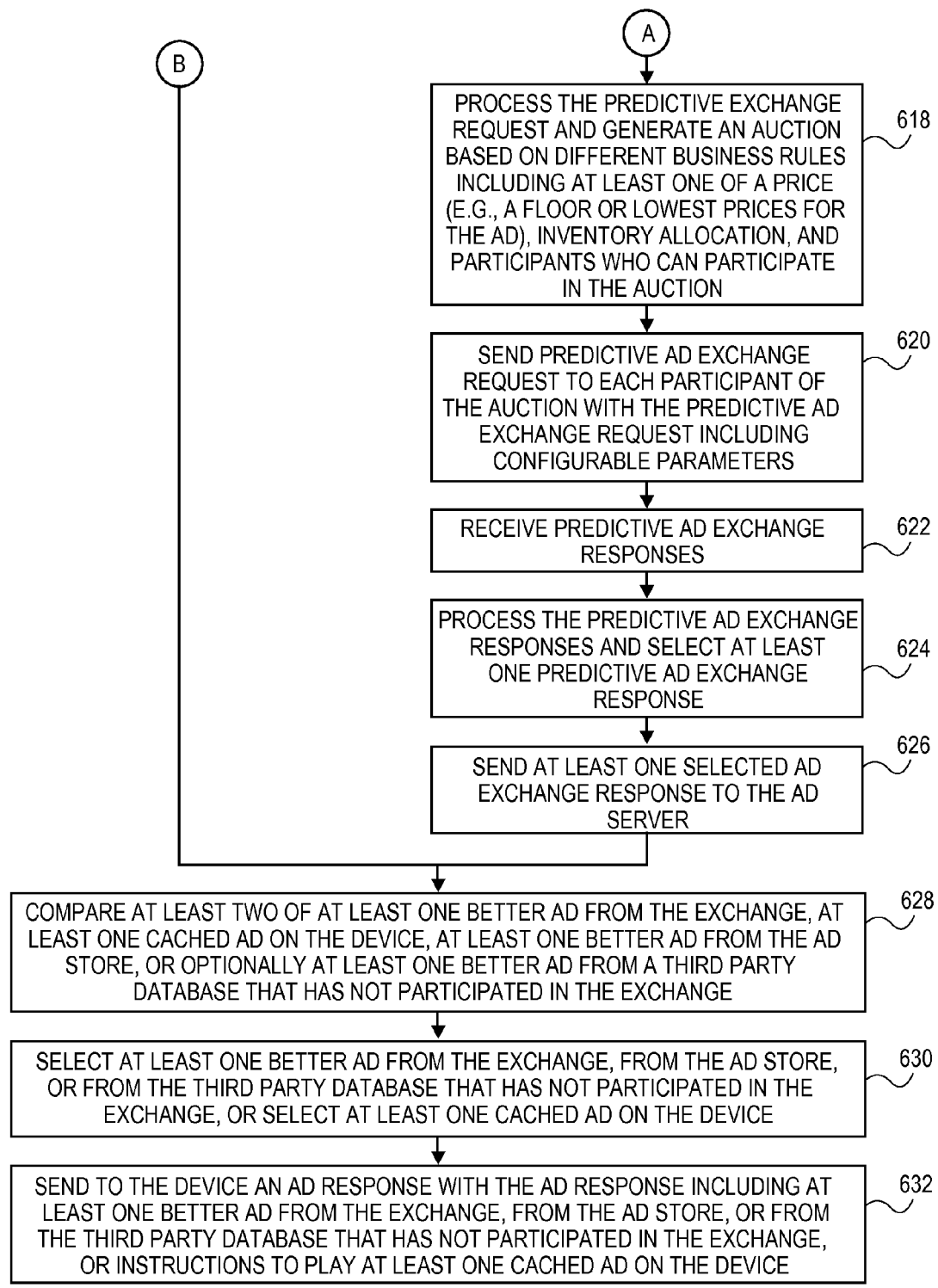
Figure 6C:
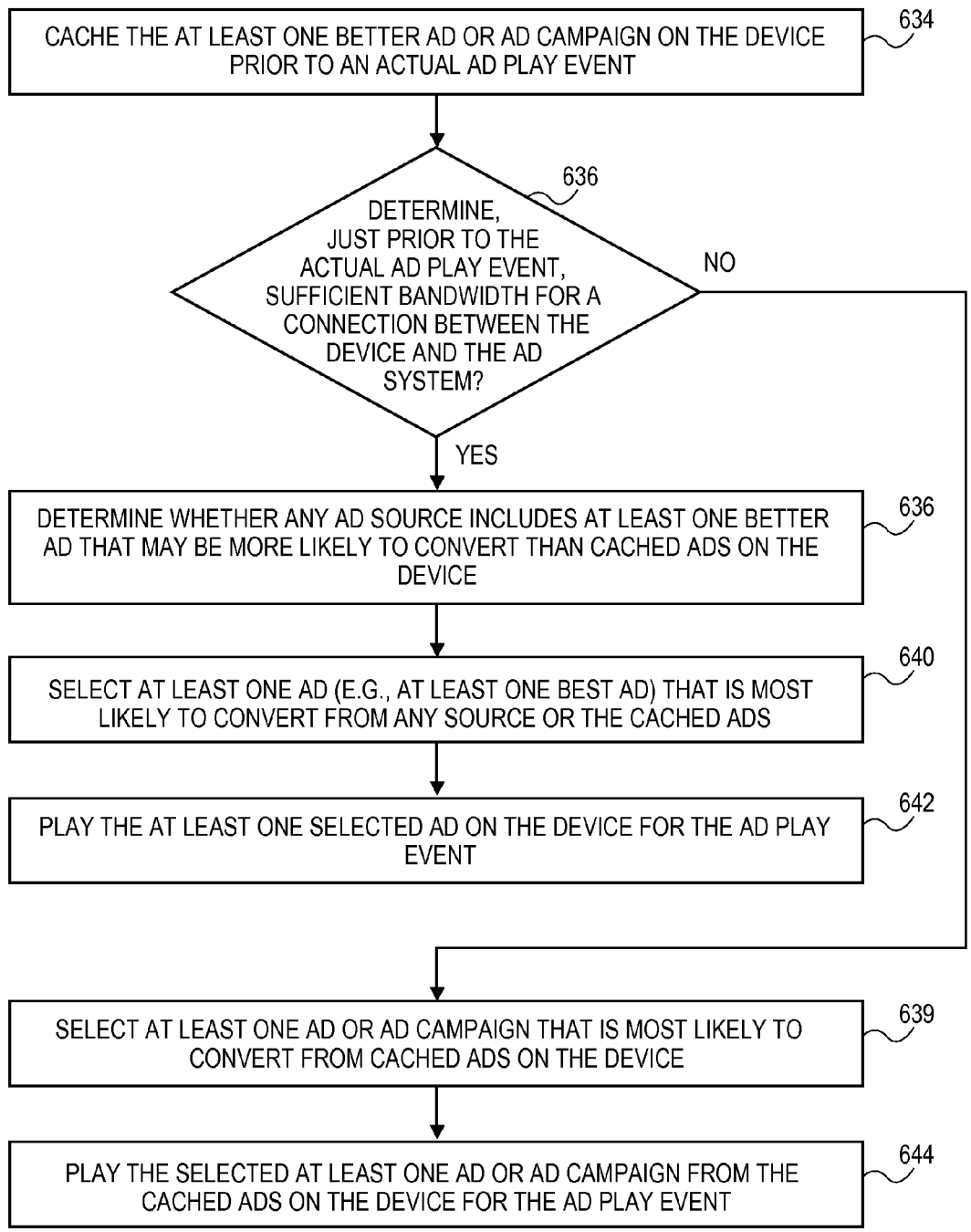

FIGS. 6A, 6B, and 6C illustrate flow diagrams of operations for a method of determining advertising services including ads or ad campaigns at multiple times for delivering to devices from any source including an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 600.

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an ad play event at a future time for displaying or playing an ad on the display of the device. At operation 604, an ad server of an ad system receives a configuration call from the device upon the initiation of the advertising services software and associated software application. At operation 606, the ad server sends a configuration file to the device in response to the configuration call. The configuration file includes different options (e.g., options 1-8 as described in conjunction with the description of FIG. 2) for obtaining an ad to play for the ad play event that is predicted to occur in the future.

At operation 608, prior to the predicted ad play event, the processing logic of the ad server generates a predictive ad request based on an anticipated ad play event occurring in the near future (e.g., 1 hr, 15 minutes, 60 seconds, 10 seconds, etc.) or the ad server optionally receives a predictive ad request from the device. Receiving the configuration call from the device indicates that the user has initiated a software application and an anticipated ad play event will likely occur in the near future even if no predictive ad request is received from the device.

At operation 610, the ad server processes the predictive ad request and determines based on a determined option of the configuration file whether a stored (e.g., cached) ad on the device will be used (e.g., option 1 playing ad from device cache) or the ad store, the exchange, or the ad store and the exchange need to be accessed in a predictive manner for the predictive ad request. The ad server (or device functionality 248 of the device 230) determines which option of options 1-8 (or any available options of the configuration file) will be processed or enabled for processing the ad request based on one or more configurable parameters. In one embodiment, the configurable parameters include bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange).

In one example, bandwidth for the connection between the device and the ad server or between the device and the ad system determines availability of at least some of these options (e.g., options 1-8). A low bandwidth connection (e.g., cellular connection, 3G connection) may cause options 2-4, streaming options 5-8, or options 2-8 to be disabled in order to avoid sending or attempting to send an ad payload with at least one video ad or video ad campaign across the low bandwidth connection. In this manner, the ad system improves utilization of available bandwidth for this connection and does not lead to user frustration in having the low bandwidth connection slow operations and performance of the user's device. In another example, a moderate or high bandwidth connection (e.g., WiFi connection, 4G LTE connection, $5^{th}$ generation mobile networks or $5^{th}$ generation wireless systems (5G) connection) may cause options 1-8 to be enabled in order to allow the option of additional ad inventory with more engaging ads and higher conversion rates for sending an ad payload with at least one video ad or video ad campaign across the moderate or high bandwidth connection. In this manner, the ad system improves utilization of available bandwidth for this moderate or high connection with sufficient bandwidth for performing options 2-8.

At operation 612, for option 1, at least one ad is played on the device from stored (e.g., cached) ads on the device. At operation 614, for ad store options (e.g., options 2, 4, 6, or 8), the ad server predictively accesses the ad store of the ad system for at least one better ad or obtains a third party serving tag to access a third data base for at least one better ad. At operation 616, the ad server upon processing the ad request may predictively access the exchange given certain options (e.g., options 3, 4, 7, and 8) of the configuration file. In this case, the exchange is accessed by the ad server sending a predictive exchange request to the auction system. At operation 618, the auction system processes the predictive exchange request and generates an auction based on different business rules including at least one of a price (e.g., a floor or lowest price for the ad), inventory allocation, and participants who can participate in the auction. The auction determines which participant can provide at least one better ad for the device in a timely manner for a higher or highest auction price. At operation 620, the auction engine sends a predictive ad exchange request to each participant of the auction. The ad exchange request includes configurable parameters including at least one of ad length, bit rate for playing the ad, ad categories, age ratings, a limit for a number of redirects for obtaining at least one ad to minimize latency, and the floor price. One or more participants then respond with predictive ad exchange responses at operation 622. The auction system processes the predictive ad exchange responses (bids) and selects at least one predictive ad exchange response if any for serving at least one better ad for playing on the device at operation 624.

At operation 626, at least one selected predictive ad exchange response is sent from the auction system to the ad server. At operation 628, the ad server can optionally compare at least two of a selected at least one better ad from the exchange, at least one stored (e.g., cached) ad on the device, at least one better ad obtained from the ad store, or optionally at least one better ad from a third party database 297 that has not participated in the exchange. At operation 630, the ad server can then optionally select at least one better ad from the ad store, at least one better ad of a selected ad exchange response (bid) from the exchange, a stored (e.g., cached) ad on the device, or optionally at least one better ad from a third party database 297 that has not participated in the exchange. In another embodiment, the winning or selected ad from the exchange is sent to the device without comparing it to other ads (e.g., a cached ad, a better ad from the ad store). In an embodiment, the better ad from the ad store is sent to the device without comparing it to other ads. A better ad is anticipated to be more likely to convert (e.g., convert into a click or purchase or transaction, obtain user interaction with the ad) than a stored (e.g., cached) ad on the device. At operation 632, the ad server can then send to the device an ad response with at least one better ad from the ad store, at least one better ad from the exchange, at least one ad from a third party database that has not participated in the exchange, or instructions to play the stored (e.g., cached) ad on the device.

In one embodiment, at operation 634, the at least one better ad or ad campaign is stored (e.g., cached) on the device prior to an actual ad play event. For example, any number (e.g., 1-10) of ads or ad campaigns including performance and brand ads may be stored (e.g., cached) on the device prior to the actual ad play event. Performance and brand ads compete to be cached on a user's device. The selected winning ads that yield the highest revenue for publishers and are most likely to be interacted with by the user are temporarily stored on the user's device.

At operation 636, just prior to the actual ad play event, bandwidth for a connection between the device and the ad system is determined by the system (or device). If a sufficient bandwidth is available for streaming an ad or ad campaign from any ad source (e.g., ad store, third party ad data base, ad exchange) to the device in time for the ad play event (in addition to possibly considering additional configurable parameters), then at operation 638 a determination is made by the system (or device) in regards to whether any ad source includes at least one better ad that may be more likely to convert than stored (e.g., cached) ads on the device. The additional configurable parameters that may be considered in determining whether at least one ad or ad campaign can be obtained in time for the ad play event include bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). For this operation, the streamed at least one better ad or ad campaign is compared with the stored (e.g., cached) ads on the device. At operation 640, at least one ad (e.g., at least one best ad) that is most likely to convert or cause user interaction with the at least one ad is selected from any source or the cached ads. At operation 642, the at least one selected ad is played on the device for the ad play event.

If a sufficient bandwidth is not available for streaming an ad or ad campaign from any ad source (e.g., ad store, third party ad data base, ad exchange) to the device in time for the ad play event (in addition to possibly considering additional configurable parameters), then at operation 639 at least one ad or ad campaign that is most likely to convert cause user interaction is selected from stored (e.g., cached) ads on the device. At operation 644, the at least one ad or ad campaign selected from the stored (e.g., cached) ads is played on the device for the ad play event.

In one example, bandwidth for the connection between the device and the ad server or between the device and the ad system, just prior to the actual ad play event, determines availability of at least some of these options (e.g., options 1-8). A low bandwidth connection (e.g., cellular connection, 3G connection) may cause options 2-4, streaming options 5-8, or options 2-8 to be disabled in order to avoid sending or attempting to send an ad payload with at least one video ad or video ad campaign across the low bandwidth connection. In this manner, the ad system improves utilization of available bandwidth for this connection and does not lead to user frustration in having the low bandwidth connection slow operations and performance of the user's device. In another example, a moderate or high bandwidth connection (e.g., WiFi connection, 4G LTE connection, $5^{th}$ generation mobile networks or $5^{th}$ generation wireless systems (5G) connection) may cause options 1-8 to be enabled in order to allow the option of additional ad inventory with more engaging ads and higher conversion rates for sending an ad payload with at least one video ad or video ad campaign across the moderate or high bandwidth connection. In this manner, the ad system improves utilization of available bandwidth for this moderate or high connection with sufficient bandwidth for performing options 2-8.

Figure 7:
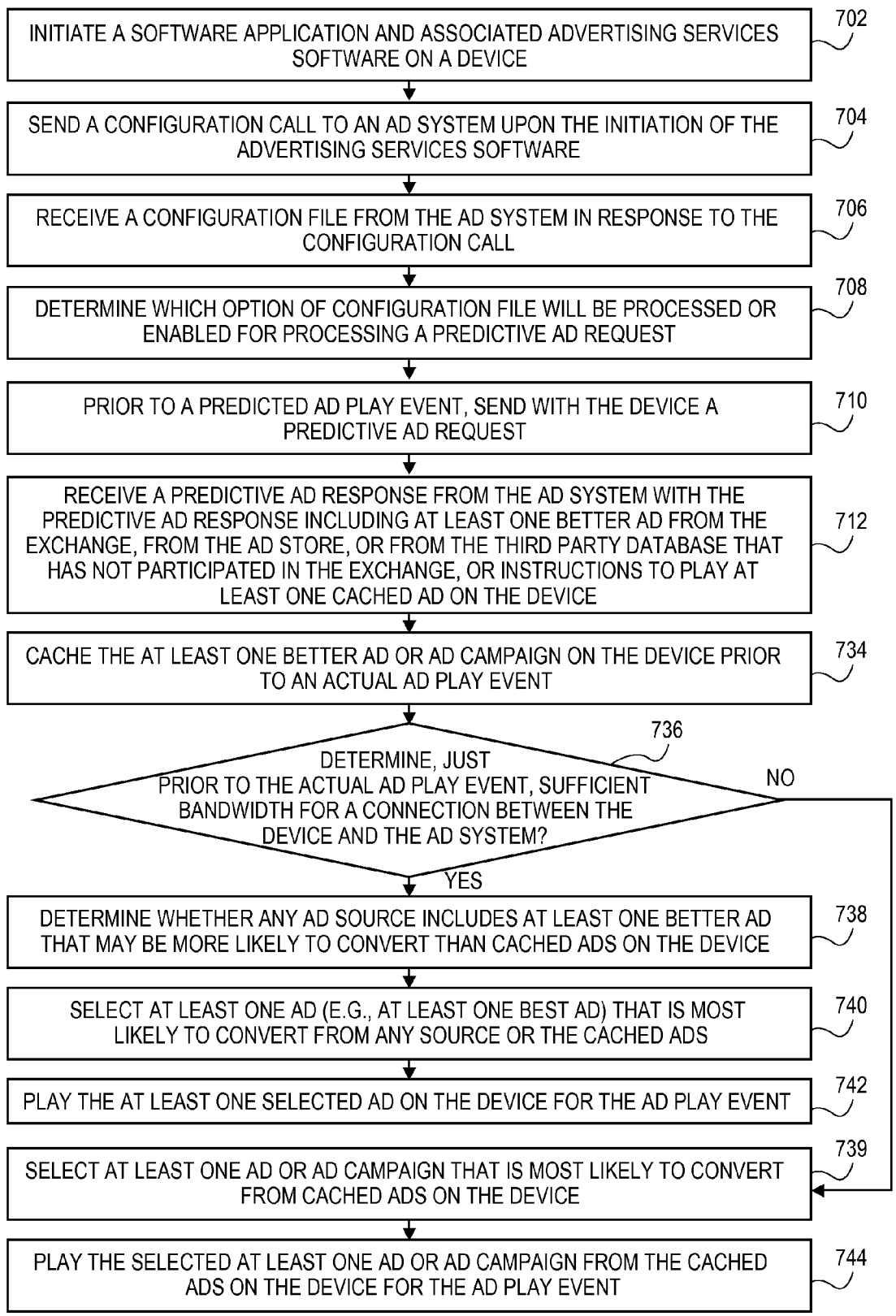
FIG. 7 illustrates a flow diagram of operations for a method of determining advertising services including stored (e.g., cached) ads and streamed ads at multiple times in a predictive manner to devices with an advertising exchange having third party exchange participants in accordance with certain embodiments.

FIG. 7 illustrates a flow diagram of operations for a method of providing advertising services including cached ads in a predictive manner with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 700.

In one embodiment, a device initiates a software application at operation 702. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 704, the device sends a configuration call to an ad server of an ad system upon the initiation of the advertising services software. At operation 706, the device receives a configuration file from the ad system in response to the configuration call. The configuration file includes different options (e.g., options 1-8 as described in conjunction with the description of FIG. 2) for obtaining at least one ad to play for a predicted ad play event that is predicted to occur in the future.

At operation 708, the device (or ad system) determines which option (e.g., 1-8) of the configuration file will be processed or enabled for processing a predictive ad request. In one embodiment, this determination is based on one or more configurable parameters including bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange).

At operation 710, prior to the predicted ad play event, the device sends a predictive ad request with a configurable determined option (e.g., options 1-8, any available options) of the configuration file to the ad server. The ad server processes the predictive ad request and performs operations similar to operations 612-630 of FIG. 6. At operation 712, the device receives a predictive ad response from the ad system. The predictive ad response includes at least one better ad from the ad store, at least one better ad from the exchange, optionally instructions to play at least one ad cached on the device, or optionally at least one better ad from third party database that has not participated in the exchange for options 2-8. The at least one better ad that is selected for the predictive ad play event is then cached on the device or streamed to the device and played when the predicted ad play event occurs. For option 1, the at least one cached ad is played on the device during the ad play event.

In one embodiment, at operation 734, the at least one better ad or ad campaign is stored (e.g., cached) on the device prior to the ad play event. For example, any number (e.g., 1-10) of ads or ad campaigns may be cached on the device prior to the ad play event. At operation 736, just prior to the ad play event, bandwidth for a connection between the device and the ad system is determined. If a sufficient bandwidth is available for streaming an ad or ad campaign from any ad source (e.g., ad store, third party ad data base, ad exchange) to the device in time for the ad play event in addition to possible consideration of other configurable parameters, then at operation 738 a determination is made in regards to whether any ad source includes at least one better ad that may be more likely to convert than cached ads on the device. The additional configurable parameters that may be considered in determining whether at least one ad or ad campaign can be obtained in time for the ad play event include bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange. For this operation, the at least one better ad or ad campaign is compared with the stored (e.g., cached) ads on the device. At operation 740, at least one ad (e.g., at least one best ad) that is most likely to convert or cause user interaction with the at least one ad is selected from any source or the stored (e.g., cached) ads. At operation 742, the at least one selected ad is played on the device for the ad play event.

If a sufficient bandwidth is not available for streaming an ad or ad campaign from any ad source (e.g., ad store, third party ad data base, ad exchange) to the device in time for the ad play event, then at operation 739 at least one ad or ad campaign that is most likely to convert or cause user interaction is selected from stored (e.g., cached) ads on the device. At operation 744, the at least one ad or ad campaign selected from the stored (e.g., cached) ads is played on the device for the ad play event.

In one example, at operation 708 or operation 734, bandwidth for the connection between the device and the ad server or between the device and the ad system determines availability of at least some of these options (e.g., options 1-8). A low bandwidth connection (e.g., cellular connection, 3G connection) may cause options 2-4, streaming options 5-8, or options 2-8 to be disabled in order to avoid sending or attempting to send an ad payload with at least one video ad or video ad campaign across the low bandwidth connection. In this manner, the ad system improves utilization of available bandwidth for this connection and does not lead to user frustration in having the low bandwidth connection slow operations and performance of the user's device. In another example, a moderate or high bandwidth connection (e.g., WiFi connection, 4G LTE connection, $5^{th}$ generation mobile networks or $5^{th}$ generation wireless systems (5G) connection) may cause options 1-8 to be enabled in order to allow the option of additional ad inventory with more engaging ads and higher conversion rates for sending an ad payload with at least one video ad or video ad campaign across the moderate or high bandwidth connection. In this manner, the ad system improves utilization of available bandwidth for this moderate or high connection with sufficient bandwidth for performing options 2-8.

In some embodiments, the operations of the methods disclosed herein can be altered, modified, combined, or deleted. For example, the operation 308 can occur early or later in the flow of operations of method 300. This determination of operation 308 may not occur until a latency is known for obtaining an ad from the ad store or from the exchange. In a similar manner, the operation 410 can occur early or later in the flow of operations of method 400. This determination of operation 410 may not occur until a latency is known for obtaining an ad from the ad store or from the exchange. In a similar manner, the operation 610 can occur early or later in the flow of operations of method 600. This determination of operation 610 may not occur until a latency is known for obtaining an ad from the ad store or from the exchange. Some of the operations may occur simultaneously or nearly simultaneously. For example, the operations 634 and 636 may occur simultaneously or nearly simultaneously. The methods in embodiments of the present invention may be performed with an apparatus or data processing system as described herein. The apparatus or data processing system may be a conventional, general-purpose computer system or special purpose computers, which are designed or programmed to perform only one function, may also be used.

Figure 8:
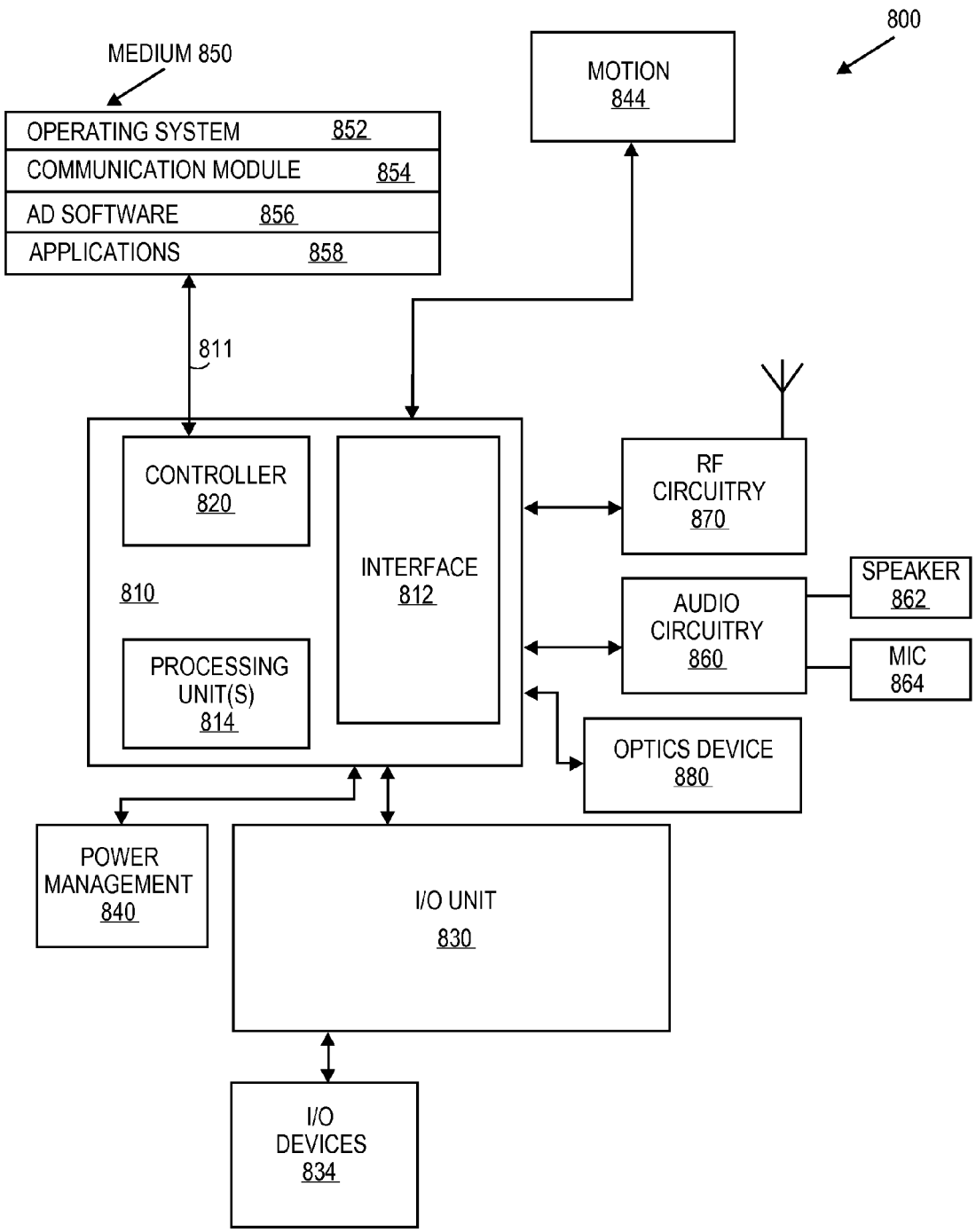
FIG. 8 is a block diagram of a wireless device 800 in accordance with one embodiment.

FIG. 8 is a block diagram of a wireless device 800 in accordance with one embodiment. The wireless device 800 may be any type of wireless device (e.g., cellular phone, wireless phone, tablet, etc.) for sending and receiving wireless communications. The wireless device includes a processing system 810 that includes a controller 820 and processing units 814. The processing system 810 communicates with an Input/Output (I/O) unit 1030, radio frequency (RF) circuitry 870, audio circuitry 860, an optics device 860 for capturing one or more images or video, a motion device 844 (e.g., an accelerometer, gyroscope) for determining motion data (e.g., in three dimensions, 6 axis, 7 axis, 9 axis, etc.) for the wireless device 800, power management system 840, and machine-accessible non-transitory medium 850. These components are coupled by one or more communication links or signal lines.

RF circuitry 870 is used to send and receive information over a wireless link or network to one or more other devices. Audio circuitry 860 is coupled to audio speaker 862 and microphone 864 and includes known circuitry for processing voice signals.

One or more processing units 814 communicate with one or more machine-accessible non-transitory mediums 850 (e.g., computer-readable medium) via controller 820. Medium 850 can be any device or medium (e.g., storage device, storage medium) that can store code and/or data for use by one or more processing units 814. Medium 850 can include a memory hierarchy, including but not limited to cache, main memory and secondary memory. The medium 850 stores one or more sets of instructions (or software) embodying any one or more of the methodologies or functions described herein. The software may include an operating system 852, advertising services software 856 (e.g., SDK 856), communications module 854, and applications 858 (e.g., publisher applications, developer applications, a web browser, html5 applications, etc.). The software may also reside, completely or at least partially, within the medium 850 or within the processing units 814 during execution thereof by the device 800. The components shown in FIG. 8 may be implemented in hardware, software, firmware or any combination thereof, including one or more signal processing and/or application specific integrated circuits.

Communication module 854 enables communication with other devices. The I/O unit 830 communicates with different types of input/output (I/O) devices 834 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 850 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system receives a configuration call from a device upon initiation of a software application and associated advertising services software on the device. The system generates, prior to a predicted ad play event on the device, a predictive ad request for obtaining at least one advertisement (ad) from at least one of an ad store and an advertising exchange prior to the predicted ad play event. The at least one ad is stored on the device prior to an actual ad play event. The system determines, just prior to the actual ad play event, a bandwidth for a connection between the device and the system. The system determines if any ad source includes at least one ad that is more likely to convert than the ads stored on the device based on the bandwidth for the connection between the device and the system for streaming the at least one ad from any ad source to the device in time for the actual ad play event.

In one embodiment, the processing logic is further configured to execute instructions of at least one software program to select at least one ad that is most likely to convert from any ad source or the stored ads on the device prior to the actual ad play event. The processing logic is further configured to execute instructions of at least one software program to select at least one ad that is most likely to convert from the stored ads on the device prior to the actual ad play event if a sufficient bandwidth is not available for streaming an ad or ad campaign from any ad source to the device in time for the ad play event.

In one embodiment, the processing logic is further configured to execute instructions of at least one software program to access the advertising exchange based on the predictive ad request and generate an auction based on different business rules including at least one of a floor price and inventory allocation. The processing logic is further configured to execute instructions of at least one software program to send a predictive ad exchange request to each participant of the auction with the predictive ad exchange request including configurable parameters including at least one of ad length, bit rate for playing the ad, ad categories, age ratings, a limit for a number of redirects to minimize latency, and a floor price, receive ad exchange responses from one or more participants of the auction, process the ad exchange responses, and determine which of the one or more participants if any will serve at least one ad based on a conversion rate of at least one ad from the ad exchange responses for the predicted ad play event.

In one embodiment, a machine-accessible non-transitory medium containing executable computer program instructions which when executed by a data processing system cause said system to perform a method that includes generating with the system, prior to a predicted ad play event on a device, a predictive ad request for obtaining at least one advertisement (ad) from at least one of an ad store of the system and an advertising exchange prior to the predicted ad play event. The method also includes processing the predictive ad request and determining whether the ad store of the system will be accessed for at least one ad to be stored on the device prior to an actual ad play event and whether the ad exchange to be accessed for at least one ad to be stored on the device prior to the actual ad play event. The at least one ad is stored on the device prior to the actual ad play event. The method further includes determining, just prior to the actual ad play event, a bandwidth for a connection between the device and the system. The method further includes determining if any ad source includes at least one ad that is more likely to convert or cause user interaction than the ads stored on the device based on the bandwidth for the connection between the device and the system for streaming the at least one ad from any ad source to the device in time for the actual ad play event.

For example, in one embodiment, the method further includes selecting at least one ad that is most likely to convert from any ad source or the stored ads on the device prior to the actual ad play event. The method further includes selecting at least one ad that is most likely to convert from the stored ads on the device prior to the actual ad play event if a sufficient bandwidth is not available for streaming an ad or ad campaign from any ad source to the device in time for the ad play event.

In one embodiment, the method further includes accessing the advertising exchange based on the predictive ad request and generating an auction based on different business rules including at least one of a floor price and inventory allocation. The method further includes sending a predictive ad exchange request to each participant of the auction with the predictive ad exchange request including configurable parameters including at least one of ad length, bit rate for playing the ad, ad categories, age ratings, a limit for a number of redirects to minimize latency, and a floor price. The method may include receiving ad exchange responses from one or more participants of the auction, processing the ad exchange responses, and determining which of the one or more participants if any will serve at least one ad based on a conversion rate of at least one ad from the ad exchange responses for the predicted ad play event. The method further includes sending a predictive ad exchange request to each participant of the auction with the predictive ad exchange request including configurable parameters including at least one of ad length, bit rate for playing the ad, ad categories, age ratings, a limit for a number of redirects to minimize latency, and a floor price. The method may include receiving ad exchange responses from one or more participants of the auction, processing the ad exchange responses and determining which of the one or more participants if any will serve at least one ad based on a conversion rate of at least one ad from the ad exchange responses for the predicted ad play event.

In one embodiment, a method for providing advertising services for a device includes initiating a software application on a device, generating with the device, prior to a predicted ad play event on the device, a predictive ad request for obtaining at least one advertisement (ad) from at least one of the ad store and an advertising exchange prior to the predicted ad play event, determining with the device whether the ad store of the system to be accessed for at least one ad to be stored on the device prior to an actual ad play event and whether the ad exchange to be accessed for at least one ad to be stored on the device prior to the actual ad play event, store the at least one ad on the device prior to the actual ad play event and determining, just prior to the actual ad play event, a bandwidth for a connection between the device and the system.

For example, the method further includes determining if any ad source includes at least one ad that is more likely to convert than the ads stored on the device based on the bandwidth for the connection between the device and the system for streaming the at least one ad from any ad source to the device in time for the actual ad play event. The method further includes selecting at least one ad that is most likely to convert from any ad source or the stored ads on the device prior to the actual ad play event. For example, the method further includes selecting at least one ad that is most likely to convert from the stored ads on the device prior to the actual ad play event if a sufficient bandwidth is not available for streaming an ad or ad campaign from any ad source to the device in time for the ad play event.

In one embodiment, a machine-accessible non-transitory medium containing executable computer program instructions which when executed by a device cause said device to perform a method, the method including initiating a software application on a device, generating with the device, prior to a predicted ad play event on the device, a predictive ad request for obtaining at least one advertisement (ad) from at least one of an ad store of a system and an advertising exchange prior to the predicted ad play event, determining with the device whether the ad store of the system to be accessed for at least one ad to be stored on the device prior to an actual ad play event and whether the ad exchange to be accessed for at least one ad to be stored on the device prior to the actual ad play event, storing (e.g., caching) the at least one ad on the device prior to the actual ad play event, and determining, just prior to the actual ad play event, a bandwidth for a connection between the device and the system.

The method further includes determining if any ad source includes at least one ad that is more likely to convert than the ads stored on the device based on the bandwidth for the connection between the device and the system for streaming the at least one ad from any ad source to the device in time for the actual ad play event. The method further includes selecting at least one ad that is most likely to convert or cause user interaction from any ad source or the stored ads on the device prior to the actual ad play event. The method further includes selecting at least one ad that is most likely to convert from the stored (e.g., cached) ads on the device prior to the actual ad play event if a sufficient bandwidth is not available for streaming an ad or ad campaign from any ad source to the device in time for the ad play event.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system, comprising:
an ad store of the system to store advertisements (ads);
an ad server coupled to the ad store, the ad server includes a storage medium to store one or more software programs and processing logic that is configured to execute instructions of at least one software program to:
generate with the system, prior to a predicted ad play event to display on a wireless device, a predictive ad request that is based on the predicted ad play event;
determine a first bandwidth at a first time for a network connection between one or more participants of an advertising exchange and the system,
determine a second bandwidth at a second time for a network connection between the wireless device and the system,
process the predictive ad request to determine available options to obtain at least one advertisement (ad) in time for the predicted ad play event based on the first bandwidth and the second bandwidth, access the ad store of the system for at least one ad when the second bandwidth is sufficient to obtain the at least one ad in time for the predicted ad play event, perform an ad auction with the ad exchange in real time prior to the predicted ad play event and access the ad exchange for at least one ad when the first bandwidth is sufficient to obtain the at least one ad in time for the predicted ad play event, and select, based on anticipated likelihood of converting, at least one ad among a cached ad stored on the wireless device, the at least one ad from the ad store, and the at least one ad from the ad exchange.

2. The system of claim 1, wherein the processing logic is further configured to execute instructions of at least one software program to:

store the selected at least one ad on the wireless device prior to an actual ad play event when the at least one ad is selected from the ad store or the ad exchange;

determine a third bandwidth at a third time for the network connection between the one or more participants of the ad exchange and the system;

determine a fourth bandwidth at a fourth time for the network connection between the wireless device and the system; and determine if at least one ad is available from the ad store or the ad exchange that is more likely to convert than the ads stored on the wireless device.

3. The system of claim 2, wherein the processing logic is further configured to execute instructions of at least one software program to: select, based on anticipated likelihood of converting, at least one ad from the ad store, the ad exchange, or stored on the wireless device when sufficient bandwidth is available for obtaining the at least one ad from the ad store or the ad exchange to the wireless device in time for the ad play event.

4. The system of claim 3, wherein the processing logic is further configured to execute instructions of at least one software program to: select at least one ad from the stored ads on the wireless device when sufficient bandwidth is not available for obtaining at least one ad from the ad store or the ad exchange to the wireless device in time for the ad play event.

5. The system of claim 1, wherein the processing logic is further configured to execute instructions of at least one software program to: access the advertising exchange based on the predictive ad request; and generate an auction based on different business rules including at least one of a floor price and inventory allocation.

6. The system of claim 5, wherein the processing logic is further configured to execute instructions of at least one software program to: send a predictive ad exchange request to each participant of the auction with the predictive ad exchange request including configurable parameters including at least one of ad length, bit rate for playing the ad, ad categories, age ratings, a limit for a number of redirects to minimize latency, and a floor price; receive ad exchange responses from one or more participants of the auction; process the ad exchange responses; and determine which of the one or more participants if any will serve at least one ad based on a conversion rate of at least one ad from the ad exchange responses for the predicted ad play event.

7. A machine-accessible non-transitory medium containing executable computer program instructions which when executed by a data processing system cause said system to perform a method, the method comprising:

generating with the system, prior to a predicted ad play event to display on a wireless device, a predictive ad request that is based on the predicted ad play event;

determining a first bandwidth at a first time for a network connection between one or more participants of an advertising exchange and the system;

determining a second bandwidth at a second time for a network connection between the wireless device and the system;

processing the predictive ad request to determine available options to obtain at least one advertisement (ad) in time for the predicted ad play event based on the first bandwidth and the second bandwidth;

accessing the ad store of the system for at least one ad when the second bandwidth is sufficient to obtain the at least one ad in time for the predicted ad play event;

performing an ad auction with the ad exchange in real time prior to the predicted ad play event and access the ad exchange for at least one ad when the first bandwidth is sufficient to obtain the at least one ad in time for the predicted ad play event; and selecting, based on anticipated likelihood of converting, at least one ad among a cached ad stored on the wireless device, the at least one ad from the ad store, and the at least one ad from the ad exchange.

8. The machine-accessible non-transitory medium of claim 7, wherein the method further comprises:

storing the selected at least one ad on the wireless device prior to an actual ad play event when the at least one ad is selected from the ad store or the ad exchange;

determining a third bandwidth at a third time for the network connection between the one or more participants of the ad exchange and the system;

determining a fourth bandwidth at a fourth time for the network connection between the wireless device and the system; and determining if at least one ad is available from the ad store or the ad exchange that is more likely to convert than the ads stored on the wireless device.

9. The machine-accessible non-transitory medium of claim 8, wherein the method further comprises:

selecting, based on anticipated likelihood of converting, at least one ad from the ad store, the ad exchange, or stored on the wireless device when sufficient bandwidth is available for obtaining the at least one ad from the ad store or the ad exchange to the wireless device in time for the ad play event.

10. The machine-accessible non-transitory medium of claim 9, wherein the method further comprises: selecting at least one ad from the stored ads on the wireless device when sufficient bandwidth is not available for obtaining at least one ad from the ad store or the ad exchange to the wireless device in time for the ad play event.

11. The machine-accessible non-transitory medium of claim 7, wherein the method further comprises: accessing the advertising exchange based on the predictive ad request; and generating an auction based on different business rules including at least one of a floor price and inventory allocation.

12. The machine-accessible non-transitory medium of claim 11, wherein the method further comprises: sending a predictive ad exchange request to each participant of the auction with the predictive ad exchange request including configurable parameters including at least one of ad length, bit rate for playing the ad, ad categories, age ratings, a limit for a number of redirects to minimize latency, and a floor price; receiving ad exchange responses from one or more participants of the auction; process the ad exchange responses; and determining which of the one or more participants if any will serve at least one ad based on a conversion rate of at least one ad from the ad exchange responses for the predicted ad play event.

13. A method for providing advertising services for a wireless device comprising:
   initiating a software application on a wireless device;
   generating with the system, prior to a predicted ad play event to display on a wireless device, a predictive ad request that is based on the predicted ad play event;
   determining a first bandwidth at a first time for a network connection between one or more participants of an advertising exchange and a system;
   determining a second bandwidth at a second time for a network connection between the wireless device and the system;
   processing the predictive ad request to determine available options to obtain at least one advertisement (ad) in time for the predicted ad play event based on the first bandwidth and the second bandwidth;
   accessing an ad store of the system for at least one ad when the second bandwidth is sufficient to obtain the at least one ad in time for the predicted ad play event;
   performing an ad auction with the ad exchange in real time prior to the predicted ad play event and access the ad exchange for at least one ad when the first bandwidth is sufficient to obtain the at least one ad in time for the predicted ad play event; and
   selecting, based on anticipated likelihood of converting, at least one ad among a cached ad stored on the wireless device, the at least one ad from the ad store, and the at least one ad from the ad exchange.

14. The method of claim 13, further comprises:
   storing the selected at least one ad on the wireless device prior to an actual ad play event when the at least one ad is selected from the ad store or the ad exchange;
   determining a third bandwidth at a third time for the network connection between the one or more participants of the ad exchange and the system;
   determining a fourth bandwidth at a fourth time for the network connection between the wireless device and the system; and
   determining if at least one ad is available from the ad store or the ad exchange that is more likely to convert than the ads cached on the wireless device.

15. The method of claim 14, further comprises: selecting, based on anticipated likelihood of converting, at least one ad from the ad store, the ad exchange, or cached on the wireless device when sufficient bandwidth is available for obtaining the at least one ad from the ad store or the ad exchange to the wireless device in time for the ad play event.

16. The method of claim 13, further comprises: selecting at least one ad from the cached ads on the wireless device when sufficient bandwidth is not available for obtaining at least one ad from the ad store or the ad exchange to the wireless device in time for the ad play event.

17. A machine-accessible non-transitory medium containing executable computer program instructions which when executed by a wireless device cause said wireless device to perform a method, the method comprising:
   initiating a software application on the wireless device;
   generating with the wireless device, prior to a predicted ad play event to display on the wireless device, a predictive ad request that is based on the predicted ad play event;
   determining a first bandwidth at a first time for a network connection between one or more participants of an advertising exchange and an ad system;
   determining a second bandwidth at a second time for a network connection between the wireless device and the ad system;
   processing the predictive ad request to determine available options to obtain at least one advertisement (ad) in time for the predicted ad play event based on the first bandwidth and the second bandwidth;
   accessing an ad store of the ad system for at least one ad when the second bandwidth is sufficient to obtain the at least one ad in time for the predicted ad play event;
   access the ad exchange having an ad auction in real time prior to the predicted ad play event for at least one ad when the first bandwidth is sufficient to obtain the at least one ad in time for the predicted ad play event; and
   selecting, based on anticipated likelihood of converting, at least one ad among a cached ad stored on the wireless device, the at least one ad from the ad store, and the at least one ad from the ad exchange.

18. The machine-accessible non-transitory medium of claim 17, wherein the method further comprises:
   storing the selected at least one ad on the wireless device prior to an actual ad play event when the at least one ad is selected from the ad store or the ad exchange;
   determining a third bandwidth at a third time for the network connection between the one or more participants of the ad exchange and the system;
   determining a fourth bandwidth at a fourth time for the network connection between the wireless device and the system; and
   determining if at least one ad is available from the ad store or the ad exchange that is more likely to convert than the ads stored on the wireless device.

19. The machine-accessible non-transitory medium of claim 18, wherein the method further comprises: selecting, based on anticipated likelihood of converting, at least one ad from the ad store, the ad exchange, or stored on the wireless device when sufficient bandwidth is available for obtaining the at least one ad from the ad store or the ad exchange to the wireless device in time for the ad play event.

20. The machine-accessible non-transitory medium of claim 19, wherein the method further comprises: selecting at least one ad from the stored ads on the wireless device when sufficient bandwidth is not available for obtaining at least one ad from the ad store or the ad exchange to the wireless device in time for the ad play event.

\* \* \* \* \*